(12) United States Patent
Wright (10) Patent No.: US 7,806,093 B2
(45) Date of Patent: Oct. 5, 2010

(54) VARIABLE VALVE TIMING CONTROL

(75) Inventor: Andrew Wright, Coventry (GB)

(73) Assignee: Denso Corporation, Kariya (JP)

( * ) Notice: Subject to any disclaimer, the term of this patent is extended or adjusted under 35 U.S.C. 154(b) by 351 days.

(21) Appl. No.: 11/808,321

(22) Filed: Jun. 8, 2007

(65) Prior Publication Data

US 2008/0011256 A1 Jan. 17, 2008

(30) Foreign Application Priority Data

Jul. 12, 2006 (GB) .................. 0613874.7

(51) Int. Cl.
*F01L 1/34* (2006.01)
(52) U.S. Cl. ............... 123/90.17; 123/90.15; 123/90.31
(58) Field of Classification Search .............. 123/90.15, 123/90.16, 90.17
See application file for complete search history.

(56) References Cited

U.S. PATENT DOCUMENTS

| | | | | |
|---|---|---|---|---|
| 5,463,898 A | * | 11/1995 | Blander et al. ........... | 73/114.63 |
| 6,109,224 A | | 8/2000 | Morikawa et al. | |
| 6,196,173 B1 | * | 3/2001 | Takahashi et al. ........ | 123/90.15 |
| 6,494,173 B2 | * | 12/2002 | Takahashi et al. ........ | 123/90.15 |
| 6,729,280 B2 | * | 5/2004 | Muraki ..................... | 123/90.15 |
| 2001/0006061 A1 | | 7/2001 | Shimada et al. | |
| 2004/0011311 A1 | | 1/2004 | Takahashi | |
| 2004/0035380 A1 | * | 2/2004 | Davis et al. .............. | 123/90.15 |
| 2005/0126524 A1 | * | 6/2005 | Funke et al. ............. | 123/90.15 |
| 2006/0042579 A1 | | 3/2006 | Izumi et al. | |
| 2006/0096579 A1 | * | 5/2006 | Hayakawa ................. | 123/458 |

FOREIGN PATENT DOCUMENTS

| | | |
|---|---|---|
| EP | 1 486 646 | 12/2004 |
| JP | 05-248304 | 9/1993 |
| JP | 05-263705 | 10/1993 |
| JP | 2002-309994 | 10/2002 |

OTHER PUBLICATIONS

UK Search Report for GB 0613874.7, date of search Nov. 15, 2006.

* cited by examiner

*Primary Examiner*—Zelalem Eshete
(74) *Attorney, Agent, or Firm*—Nixon & Vanderhye, P.C.

(57) ABSTRACT

Engine control is provided for an engine having a crankshaft and at least one camshaft with variable valve timing in a rotation transmitting train between the crankshaft and the camshaft. A first value indicative of a cam angle at a home position at a first time is compared to a second value indicative of a cam angle at the home position at a second, earlier, time. Where a deviation in the compared values is detected that does not exceed a threshold value, the first value is stored for use in a subsequent comparison. Where a deviation in the compared values is detected that does exceed a threshold value, a failure condition is detected and the MIL light is illuminated. In this case, the value stored for comparison is not updated.

19 Claims, 7 Drawing Sheets

VARIABLE VALVE TIMING CONTROL

CROSS-REFERENCE TO RELATED APPLICATION

The present application claims priority benefits from UK patent application no 0613874.7, filed Jul. 12, 2006, the contents of which are incorporated herein by reference.

BACKGROUND

Exemplary embodiments of the present invention relate to an engine management system for an internal combustion engine.

For internal combustion engines that have variable valve timing, it is important for the that the rotation of the camshaft or camshafts controlling valve operation to be correctly aligned with the rotation of the crankshaft. Correct alignment facilitates efficient operation of the engine and low exhaust emissions. The camshaft to crankshaft alignment is normally achieved through the use of a timing train such as a chain or a belt or the like, which can provide for an accurate alignment of the crankshaft and cam rotation in use. However, it has been recognized that in some cases, for example after work has been done on an engine in a dealership or garage, it is possible that an engine might not be reassembled correctly, for example with a camshaft rotationally misaligned with respect to the crankshaft. The result of this could be that the cam timing may not be correct and this can have an effect on, for example, the emissions from the engine.

Exemplary embodiments of the present invention seek at least to mitigate such problems.

SUMMARY OF NON-LIMITING, EXEMPLARY EMBODIMENTS OF THE INVENTION

An embodiment of the invention can provide an engine control system for an engine having a crankshaft and at least one camshaft with variable valve timing in a rotation transmitting train between the crankshaft and the camshaft. The engine control system comprises an adaptation controller operable to detect a deviation in a first value indicative of a cam angle at a home position at a first time and a second value indicative of a cam angle at the home position at a second time and storage operable to store the first value where the deviation does not exceed a threshold value.

An internal combustion engine system can include an internal combustion engine and an engine control system as set out above.

An embodiment of the invention can provide an engine control system for an engine having a crankshaft and at least one camshaft with a variable valve timing device in a rotation transmitting train between the crankshaft and the camshaft. The engine control system includes a cam angle detecting means for detecting a cam angle indicative of an angle of rotation of the camshaft. The engine control system also includes a home position determining means for detecting whether the variable cam timing device is in a home position. The engine control system further includes a control means for controlling the variable cam timing device into a target position based on signals from the cam angle detecting means and the home position determining means. The engine control system also includes a skip detecting means for detecting a skip between a first value of the cam angle indicative of the home position and a second value of the cam angle indicative of the home position detected later. The engine control system further includes a memory means for storing an occurrence of the skip between the first and second values.

An embodiment of the invention can provide a method of providing engine control for an engine having a crankshaft and at least one camshaft with variable valve timing in a rotation transmitting train between the crankshaft and the camshaft. The method comprises detecting a deviation in a first value indicative of a cam angle at a home position at a first time and a second value indicative of a cam angle at the home position at a second time and providing persistent storage of the first value where the deviation does not exceed a threshold value.

BRIEF DESCRIPTION OF THE DRAWINGS

Specific non-limiting, exemplary embodiments of the present invention will now be described by way of example only with reference to the accompanying Drawings in which:

FIG. 4 (i.e., FIGS. 4a-4b) is a flow diagram illustrating part of an example of a method of operation of the engine control system of FIG. 2;

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF NON-LIMITING, EXEMPLARY EMBODIMENTS OF THE PRESENT INVENTION

Figure 1:
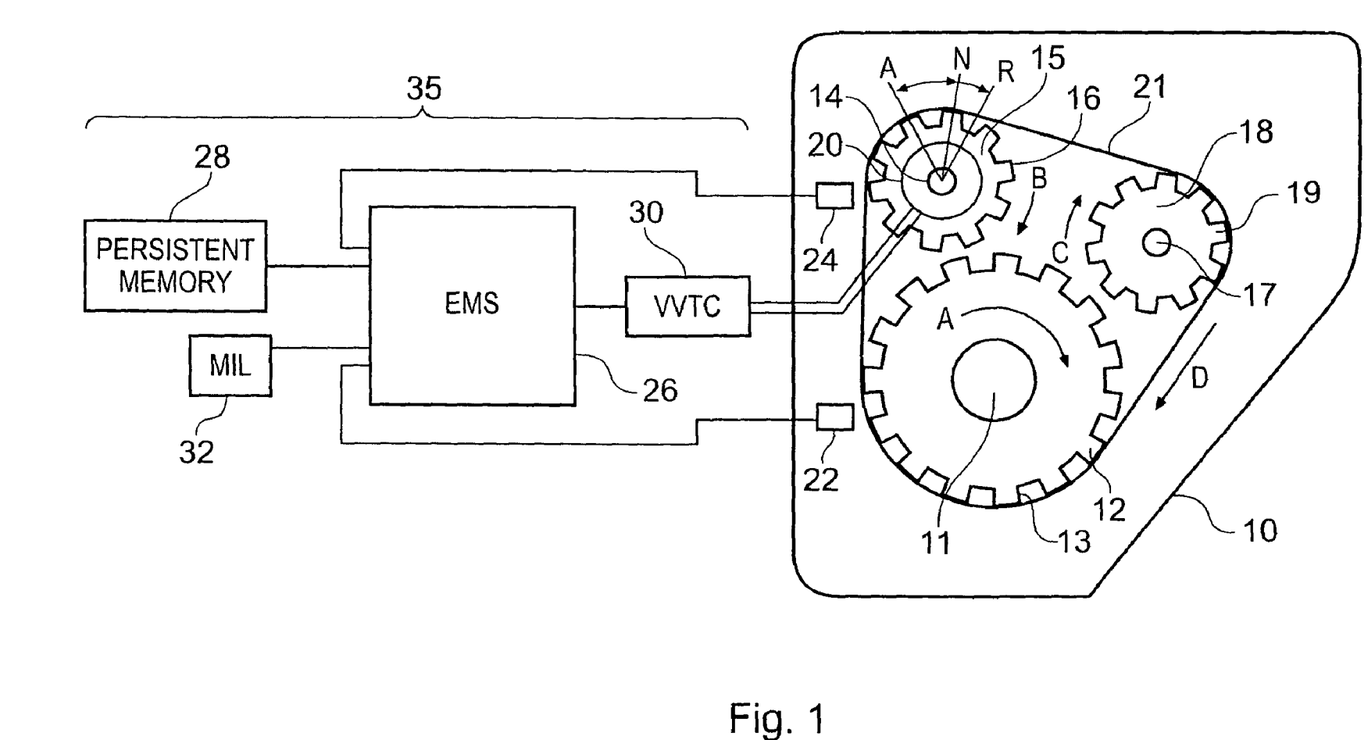
FIG. 1 is a schematic representation of an engine system.

FIG. 1 is a schematic representation of parts of an engine 10 in the form of an internal combustion engine and an associated engine control system 35. The combination of the engine 10 and the engine control system form an engine system.

A crankshaft 11 has a crank sprocket cog 12 that is provided with plurality of teeth 13. In use, the crank sprocket cog 12 rotates with the crankshaft 11 in the direction of the arrow A. An intake cam 14 has an intake cam sprocket cog 15 that is provided with a plurality of teeth 16. In use, the intake cam rotates with the intake cam sprocket 15 in the direction of the arrow B. An exhaust cam 17 has an exhaust cam sprocket cog 18 that is provided with a plurality of teeth 19. In use, the exhaust cam rotates with the exhaust cam sprocket 18 in the direction of the arrow C. In the present example, a timing chain 21 forms a rotation transmitting train for transmitting rotational movement from the crankshaft 11 via the crankshaft sprocket cog 12 to the intake camshaft sprocket cog 15 and hence to the intake camshaft 14 and to the exhaust sprocket camshaft 18 and hence to the exhaust camshaft 17. In use, the timing chain 21 rotates in the direction of the arrow D. The timing chain 21 is provided with links configured to engage with the teeth 13, 16 and 19 of the crankshaft, intake camshaft and exhaust camshaft sprocket cogs 12, 15 and 18. The teeth 13, 16 and 19 are configured to engage with the links of the timing chain 21.

In another example, the rotation transmitting train could take a form other than a timing chain, for example it could be in the form of a toothed timing belt. In this case, the teeth 13, 16 and 19 of the crankshaft, intake camshaft and exhaust camshaft sprocket cogs 12, 15 and 18 would be configured to engage with a toothed timing belt.

Also represented in FIG. 1 is an intake valve timing adjuster 20 for varying the intake valve timing. The intake valve timing adjuster 20 is responsive to a variable valve timing controller 30. In another example, an exhaust valve timing adjuster (not shown) that is responsive to the variable valve timing controller 30 could be provided instead of or in addition to the intake valve timing adjuster 20. The valve timing adjuster 20 and variable valve timing controller 30 can be implemented in any suitable manner, for example using a hydraulic technology such as is described in U.S. Pat. No. 6,505,586, the contents of which are incorporated by reference.

A crankshaft angle sensor 22 is operable to detect a crank angle and a camshaft angle sensor 24 is operable to detect an intake cam angle. The crank angle sensor 22 can be responsive to a rotational reference that rotates with the crankshaft, for example a sensor plate (not shown), to produce a crank angle signal that is representative of a crank angle at a given time. The inlet cam angle sensor 24 can be responsive to a reference that rotates with the inlet camshaft, for example a sensor plate (not shown), to produce a cam angle signal that is representative of the inlet cam angle at a given time. The signals are input to an engine management system (EMS) 26 that performs various engine management functions. The engine management functions can include providing control signals to the variable valve timing controller 30 for controlling valve timing within a given range to provide for advancing or retarding the valve timing. The engine management system 26 can be implemented in any suitable form, for example in the form of a microprocessor, a microcontroller, an application specific integrated circuit or the like.

Also represented in FIG. 1 are a persistent memory 28, in the present example in the form of an electrically erasable programmable read only memory (EEPROM), and a management information light (MIL) 32, the purposes of which will be explained below. A persistent memory is used such that the contents of the memory are not lost if there is an interruption in the power, for example if a battery is disconnected or goes flat between trips. The MIL 32 forms a warning light of the engine management system 26 on the instrument cluster of the vehicle.

Figure 2:
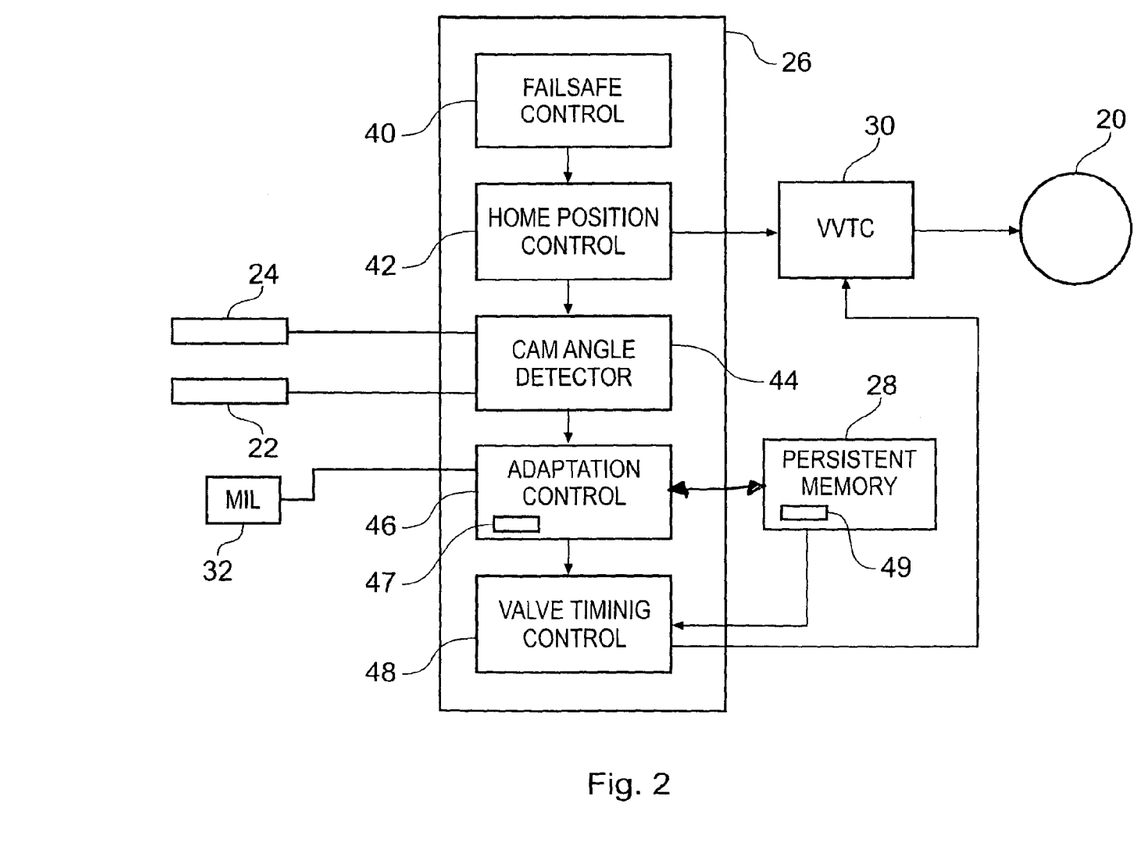
FIG. 2 is a schematic representation of functional components of an example of an engine control system.

FIG. 2 is a schematic functional block diagram illustrating functional components of an example of an engine control system 26. In the following discussion, the operation of the functional components will be described in the context of a given trip, that is a period of running of the engine following the start of the engine until the engine is subsequently stopped. In the context of the present document, it is to be understood that each restart of the engine following a stop phase of the engine forms the start of a new "trip" for the engine.

Failsafe control 40 is operable to perform control functions on starting an engine to check the integrity of the engine 10 and/or the engine management system 26.

The home position control 42 is operable on starting an engine to cause the variable valve timing controller 30 to set the variable valve timing adjuster 20 to a home position. In the present example, the variable valve timing controller 30 advances the cams such that the home position is the fully retarded position. Also, in the present example, during a full retard mode when the variable valve timing is locked, the cams are fully retarded. Accordingly, in this example, the full retard position is also a locked position.

In other examples, other configurations are possible. In general, the home position could, for example, be one of a maximum timing retard position, a maximum timing advance position or a locked timing position (e.g., a predefined setting, possibly other than the fully retarded position of the present example).

A cam angle detector 44 is responsive to signals from the crankshaft sensor 22 and the camshaft sensor 24 when the variable valve timing is in the home position to compute a home position cam angle representative of the relative rotational positions of the crankshaft 11 and the intake camshaft 14, that is a cam angle for a given crank angle in the home position. The home position control 42, the crankshaft sensor 22, the camshaft sensor 24 and the cam angle detector 44 together form a means for detecting a home position cam angle for the current trip.

Adaptation control 46 is operable to determine an adaptation value used for the control of the variable valve timing during further running of the engine. The adaptation control 46 is responsive to the home position cam angle for the current trip determined by the cam angle calculator to determine a trip adaptation value 47 for the current trip. The adaptation control 46 is then operable to compare the current trip adaptation value 47 to a reference adaptation value 49 held in the persistent memory 28. The reference adaptation value 49 held in the persistent memory 28 is a valid previous trip adaptation value stored in the memory 28 during a previous trip of the engine.

If the current trip adaptation value 47 differs from the reference adaptation value 49 by less that a predetermined amount, the adaptation control 46 stores the current trip adaptation value 47 in the persistent memory to replace the reference adaptation value 49. Where current trip adaptation value 47 differs from the reference adaptation value 49 by less than a predetermined amount, the trip adaptation value is deemed to be a valid trip adaptation value. Optionally, the reference adaptation value 49 that has just been replaced can be retained in persistent memory 28 to provide a record of adaptation values for diagnostic purposes. Such a record can be used, for example, to track the wear of components. By updating the reference adaptation value on each trip, the adaptation value that is used to control the valve timing can be adjusted over time to account for wear of the engine components, for example for wear of the timing train.

If the current trip adaptation value 47 differs from the reference adaptation value 49 by more than a predetermined amount, the current trip adaptation value 47 is deemed to be an invalid adaptation value representative of a fault or failure. Accordingly, in this case the adaptation control 46 flags a fault, prevents or prohibits the trip adaptation value from being stored in the persistent memory to replace the reference adaptation value 49 and causes the management information light (MIL) to be illuminated. In the case of a fault being flagged, the engine could be stopped immediately. However, it can alternatively be allowed to continue to run on the basis of the stored reference adaptation value, optionally with reduced engine performance and/or a failure engine mapping to preserve the integrity of the engine. In this state, the failsafe controller 40 can be operable to controlling the variable cam timing in a fail safe manner.

The predetermined amount that triggers a fault can be determined to take account of engine integrity requirements, emission control requirements or the like. In one example, the predetermined amount is a threshold value representative of a cam angle misalignment of one cam tooth (or timing chain link).

The cam angle that corresponds to one tooth can vary from example to example depending upon the number of teeth on a cam sprocket. It is to be noted that the Figures are merely schematic. Different numbers of teeth can be provided in different examples. In one example of an engine design, 58 teeth can be provided on a cam sprocket, which means that one tooth corresponds to 12.4 degrees of cam angle. In another example, a cam sprocket can comprise 60 teeth, whereby one tooth corresponds to 12 degrees of cam angle (360/60). Another example has 36 teeth per cam sprocket, which corresponds to 20 degrees of cam angle.

A sudden jump or skip in the adaptation value can, for example, be the result of an incorrect relative alignment of intake cam and the crankshaft following work on the engine since the last trip of the engine. The operation of the adaptation control 46 thus enables such a fault to be detected, while still enabling variable valve timing to take account of normal component wear.

Accordingly, the adaptation control 46 provides learning logic that enables an adaptation value to be updated, or renewed, under controlled conditions and to prohibit the updating under other conditions.

The reference adaptation value 49 held in the persistent memory 28 can then be used by a valve timing control 48 to cause the variable valve timing controller to adjust the variable valve timing. The reference adaptation value 49 represents an offset from a base valve timing value. In the present example, the variable valve timing, that is the cam timing, is calculated continuously based on a crank angle, so the engine management system compares the cam timing to the crank timing to calculate a cam angle and the adaptation value is subtracted from the calculated cam angle. In the present example, the actual cam timing is therefore the base timing minus the adaptation value. In another example, it could be the cam timing plus the adaptation value. Accordingly, the valve timing control computes a base value according to operational requirements (engine speed, load, etc.) in a conventional manner and then adjusts the computed value by the amount of the reference adaptation value 49.

As described above, in the present example, if the trip adaptation value 47 calculated for a current trip is determined by the adaptation control 46 to be valid, then this is used to update the reference adaptation value 49 and the updated reference adaptation value 49 is used by the valve timing control 48. Alternatively, the trip adaptation value 47 could be used directly by the valve timing control 48 and the reference adaptation value could be updated any appropriate time during the current trip, for example shortly after determining that the trip adaptation value is valid, during the trip, or at the end of the trip when the engine is stopped.

Accordingly, in the described example, the adaptation value represents a reference point for the variable valve timing control with respect to a base timing value. The adaptation control 46 is able to detect changes in the adaptation value that reflect changes to the base cam time. If the cam/crankshaft relationship were to be off by a predetermined amount, for example by one tooth, or some other value, then this could be recognized from changes to the adaptation value.

For a first trip for the engine, the predetermined reference adaptation value could be a pre-stored value for the first ever trip of the engine. Alternatively, on a first trip or first start, an adaptation value could be determined and then stored in memory without performing a comparison as in this case no previous value would be stored.

The failsafe control 40, the home position control 42, the cam angle detector 44, the adaptation control 46 and the valve timing control 48 can be implemented as hardware, firmware or software logic, or a combination thereof, as appropriate for the implementation of the engine management system 26, for example as a microprocessor, a microcontroller, an application specific integrated circuit or the like.

Figure 3:
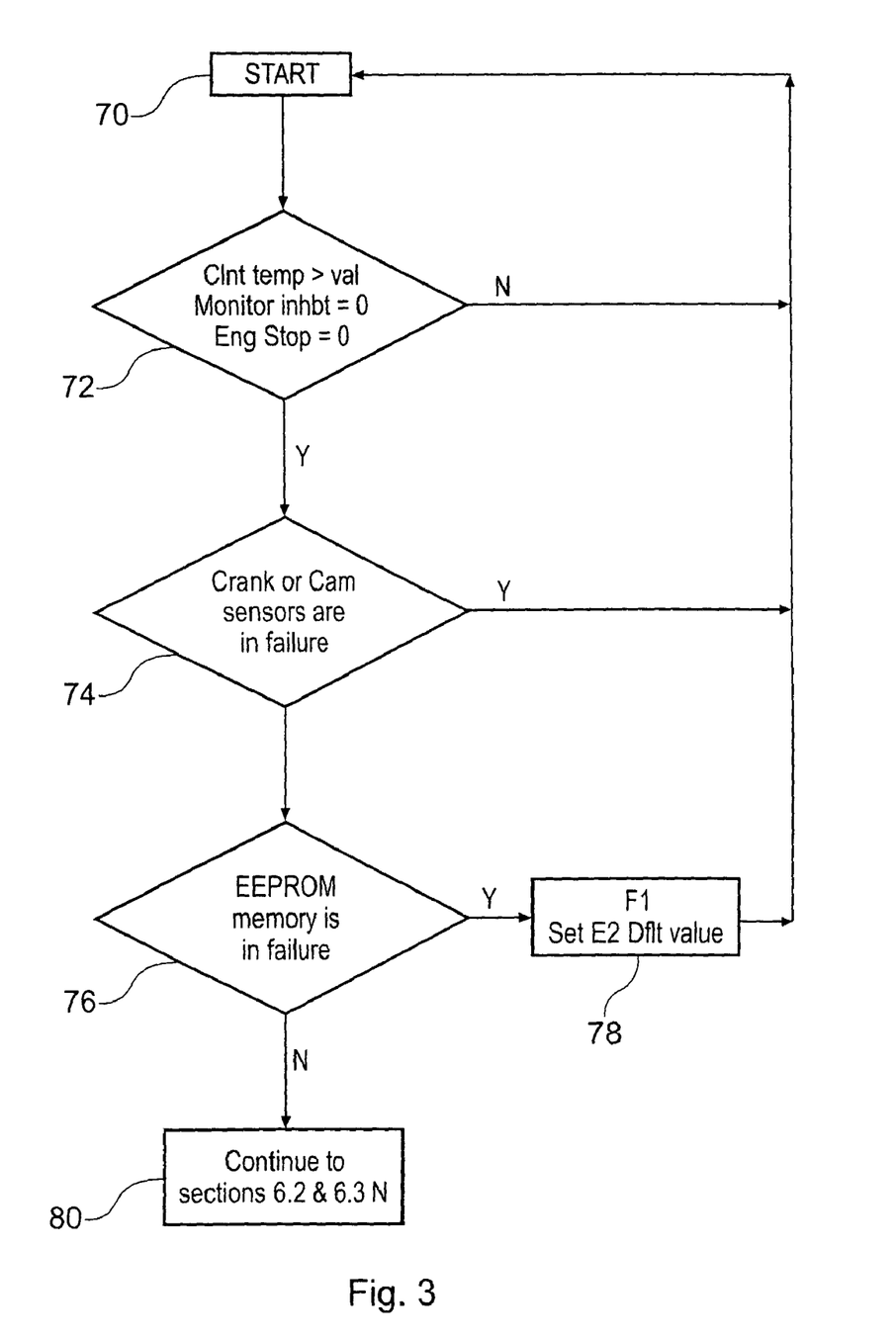
FIG. 3 is a flow diagram illustrating part of an example of a method of operation of the engine control system of FIG. 2.

FIG. 3 is a flow diagram illustrating entry conditions check for monitoring the camshaft/crankshaft alignment. This corresponds to functions that can be performed by the failsafe control 40 of FIG. 2. In FIG. 3, the process starts at step 70.

In step 72, the engine management system 26 checks that the coolant temperature is below a given threshold using the output of at least one coolant temperature sensor (not shown), checks that a monitor function is inhibited and checks that the engine is stopped. If these conditions are not met, the control passes back to step 70. Otherwise, in step 74, the status of the crankshaft and camshaft sensors is checked. If either or both of the sensors are faulty, then control passes back to step 70. Otherwise, in step 76, the status of the persistent memory 28 is checked. If the persistent memory is faulty, then in step 78, then a default value is set. Otherwise, control then passes to the steps of FIG. 4 (i.e., FIGS. 4a-4b).

Figure 4A:
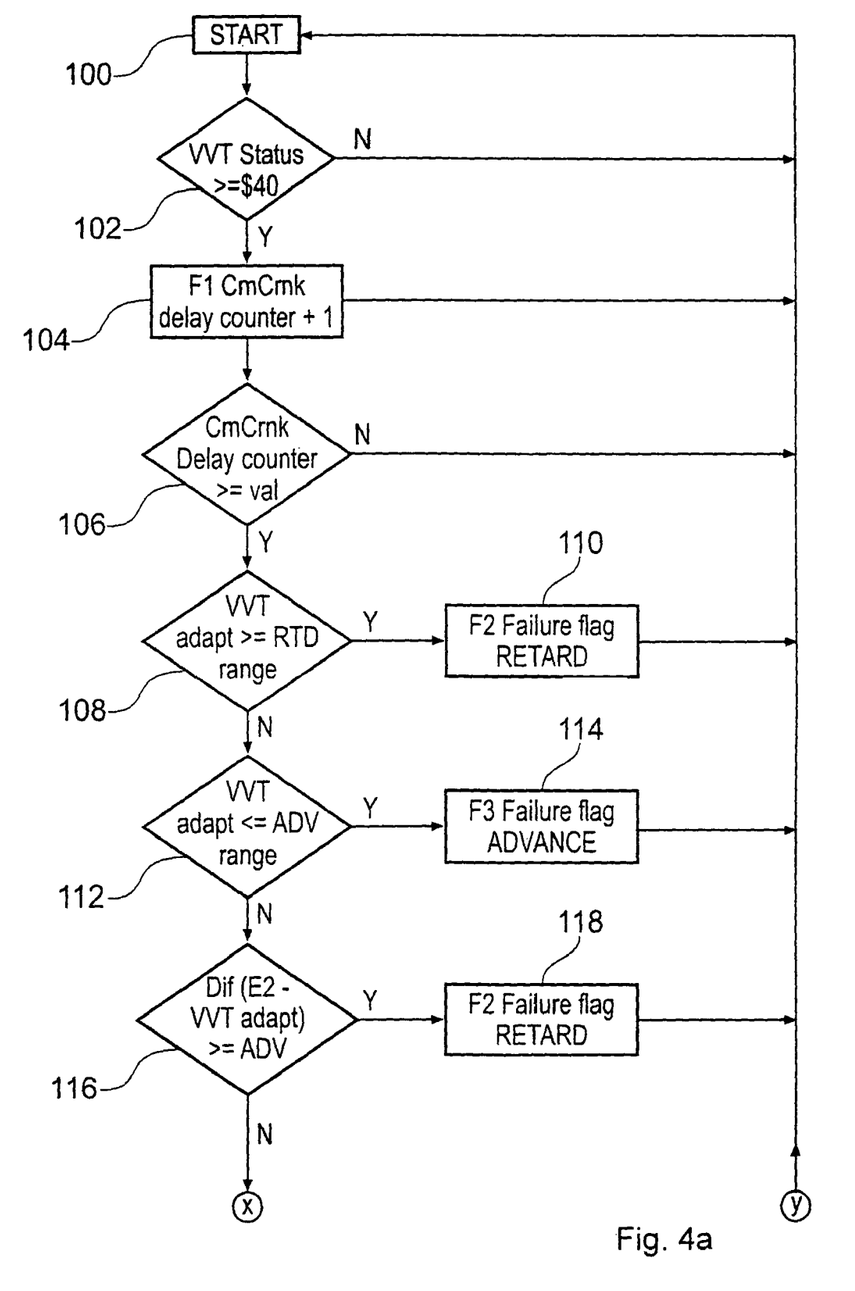
Figure 4B:
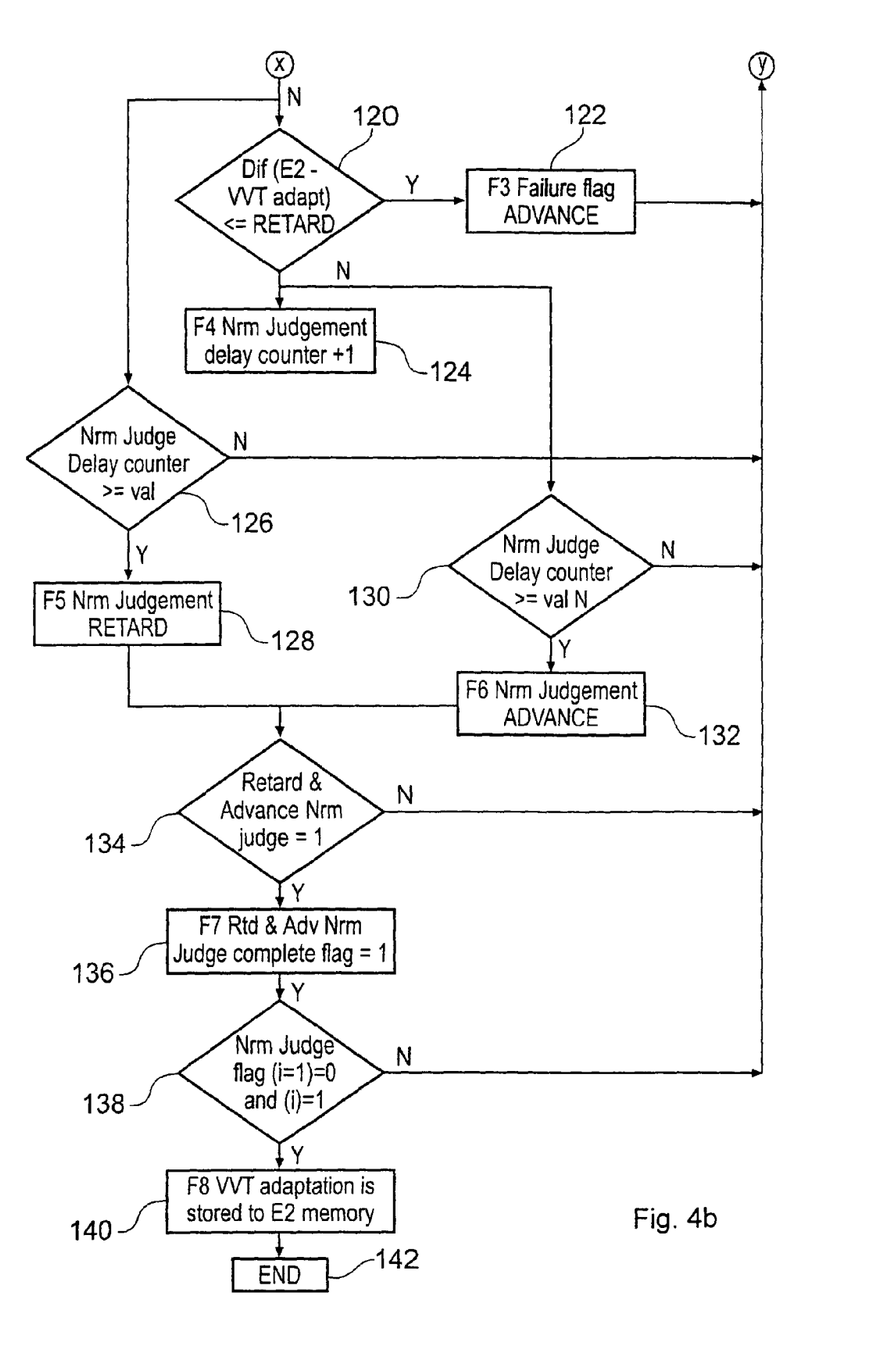

Before control passes to the step of FIG. 4, the home position control 42 is operable to cause the variable valve timing controller 30 to set the variable valve timing to a home position as described above with reference to FIG. 2. Also, the cam angle detector 44 is responsive to signals from the crankshaft sensor 22 and the camshaft sensor 24 when the variable valve timing is in the home position to compute a home position cam angle for the current trip as also described above with reference to FIG. 2.

FIG. 4 sets out an example of the operation of the adaptation control 46 of FIG. 2, starting at step 100.

In step 102, the status of the variable valve timing is checked. If this is less than a threshold value providing confirmation of a full retard position, then control passes back to step 100. Otherwise, a cam/crank delay counter is incremented.

In step 102, the adaptation control 46 checks the status of the variable valve timing. If this is less than a threshold value providing confirmation of a full retard position, then control passes back to step 100. Otherwise, the adaptation control 46 increments a cam/crank delay counter in step 104.

In step 106, the adaptation control 46 checks the current value of the cam/crank delay counter. If this less than a threshold value (val) that allows sufficient time for an adaptation update to be performed, then control passes back to step 100.

Otherwise, in step 108, the adaptation control 46 checks whether a computed trip adaptation value is within a given retard range. If this outside the retard range, then in step 110 a retard failure flag in set and control passes back to step 100.

Otherwise, in step 112, the adaptation control 46 checks whether the computed trip adaptation value is within a given advance range. If this outside the advance range, then in step 114 an advance failure flag in set and control passes back to step 100.

Otherwise, in step 116, the adaptation control 46 checks whether the result of subtracting the computed trip adaptation value from the reference adaptation value held in the persistent memory is greater than or equal to a reference advance value. If this result is greater than or equal to a reference advance value, then in step 118 the retard failure flag in set and control passes back to step 100.

If in step 116, the result is determined to be less than the reference advance value, then in step 126 the adaptation control 46 checks the current value of the cam/crank delay counter. If this less than a threshold value (val), then control passes back to step 100. Otherwise, in step 128, a normal judgment flag is set when the system is performing normally without fault.

Also, if in step 116, the result is determined to be less than the reference advance value, then in step in step 120, the adaptation control 46 checks whether the result of subtracting the computed trip adaptation value from the reference adaptation value held in the persistent memory is less than or equal to a reference retard value. If this result is less than or equal to a reference retard value, then in step 122 the advance failure flag in set and control passes back to step 100.

If in step 120, the result is determined to be greater than the reference retard value, then in step 124 a normal judgment delay is incremented. This allows for normal judgments to be made. A small duration has a risk of mis-detection of failure and therefore a period of time is allowed to elapse before the normal judgment is made.

Also, if in step 120, the result is determined to be greater than the reference retard value, then in step 130 the adaptation control 46 checks the current value of the cam/crank delay counter. If this less than a threshold value (val), then control passes back to step 100. Otherwise, in step 132 time is allowed for an adaptation calculation to be completed before making a normal judgment.

Following steps 128 and 132, in step 134, the adaptation control 46 check whether the retard and advance Nrm judgment=1. If normal judgment is NOT completed, (flags=0), then the adaptation should not be updated and control passes back to step 100.

Otherwise, in step 136, the adaptation control 46 sets retard and advance normal judgment completed flags to 1. In other words, if the system OK and the normal judgment for advance & retard is satisfactory, then monitoring completion flags are set.

In step 138, the engine management system determines whether the Nrm Judgment flag (i−1)=0 and the Nrm Judgment flag (i)=1. If this is not the case, then control passes back to step 100.

Otherwise, in step 140, the trip adaptation value is stored in the persistent memory and the process ends at step 142.

The reference adaptation value held in the persistent memory 28 can then be used by a valve timing control 48 as described with reference to FIG. 2 to cause the variable valve timing controller to adjust the variable valve timing.

Figure 5:
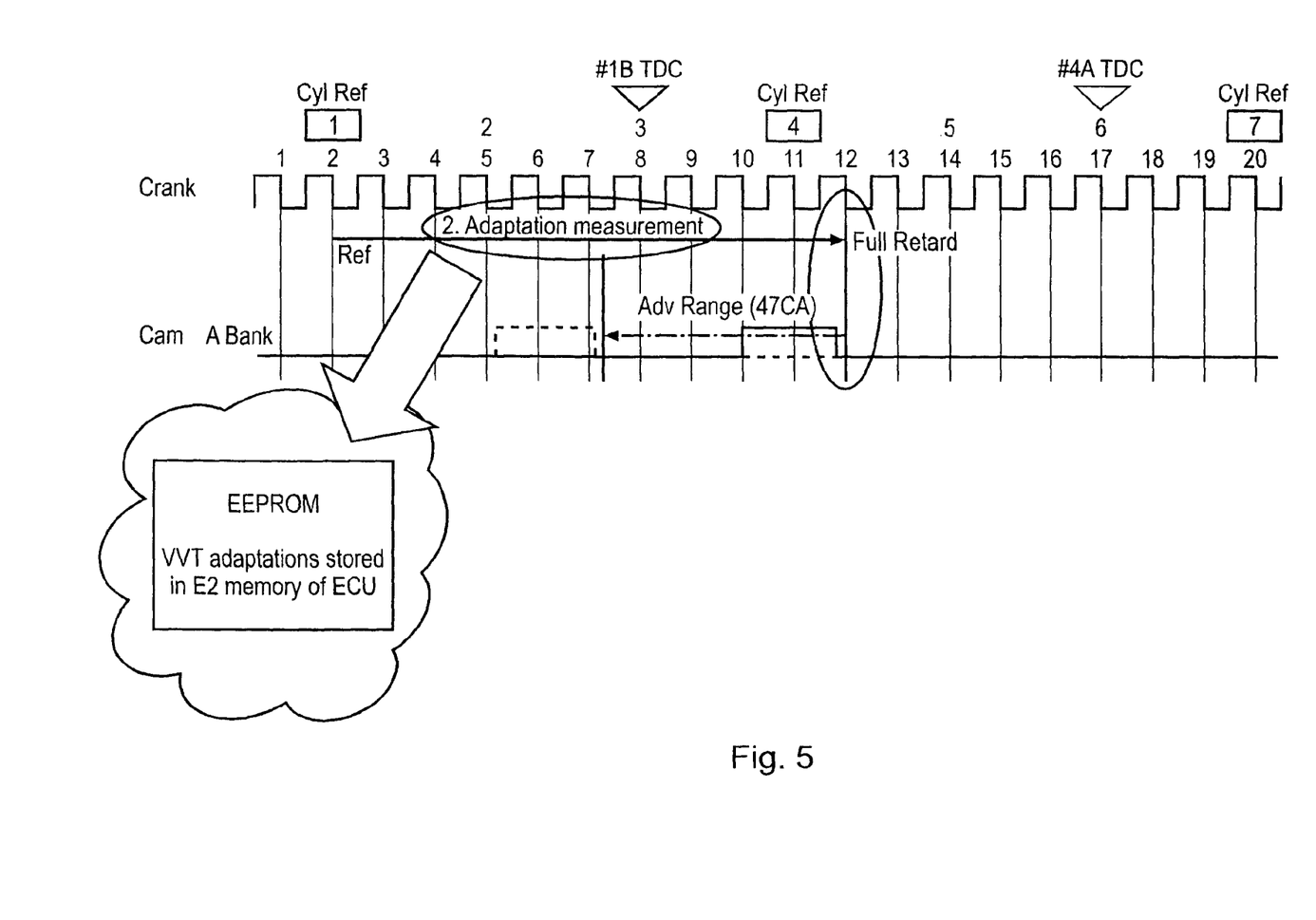
FIG. 5 is a schematic representation of an example of operation of the engine control system of FIG. 2.

FIG. 5 provides a schematic representation of the operation of an example of electronic management system operation as described above. FIG. 5 illustrates the updating to persistent memory of a valid latest variable valve timing adaptation once per vehicle trip for taking account engine and/or component wear due to age and/or usage. During each trip the a latest variable valve timing adaptation can then be compared against the adaptation value stored in memory to make a normal or fail judgment based on the difference between those values.

Figure 6:
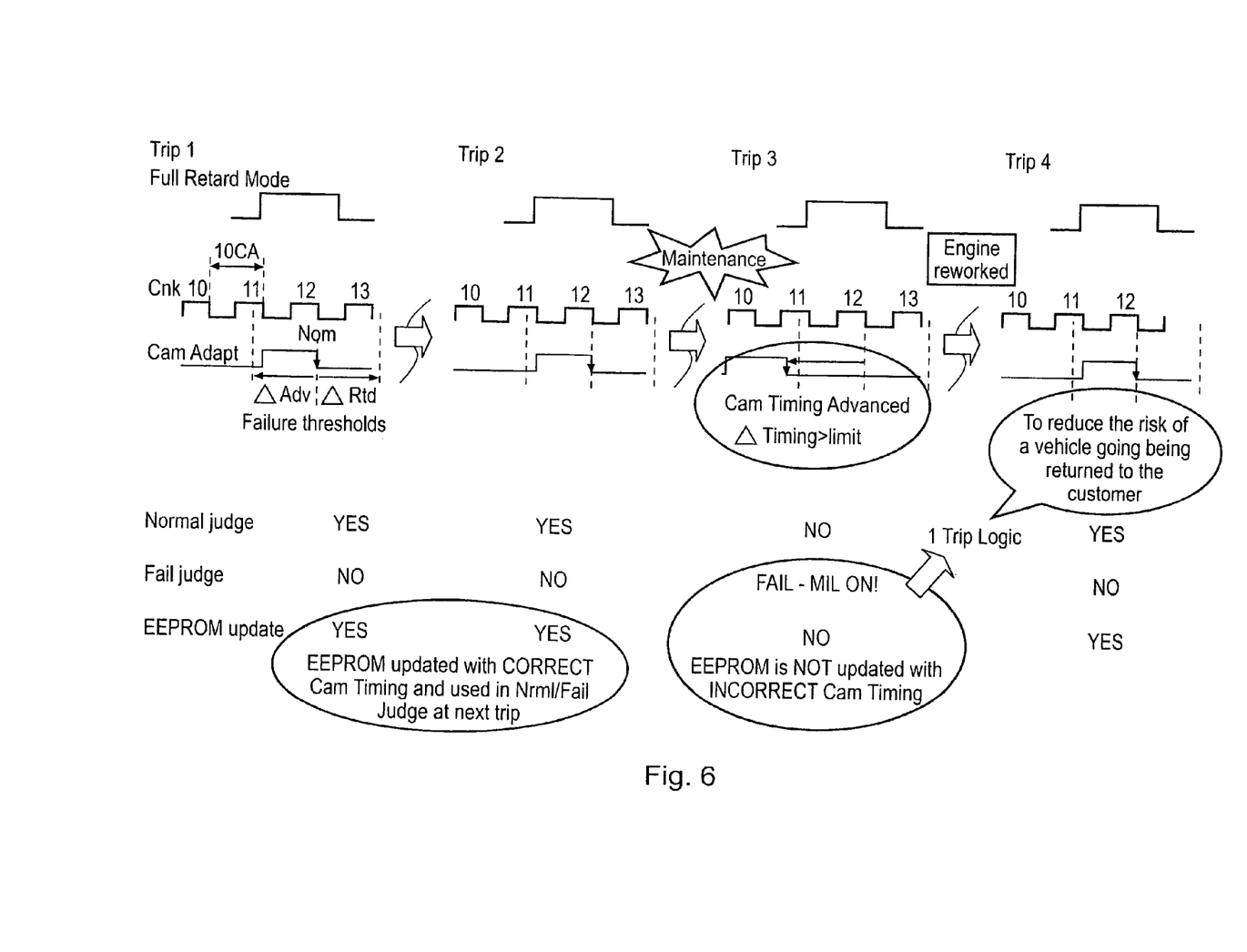
FIG. 6 is a further schematic representation of an example of operation of the engine control system of FIG. 2.

FIG. 6 represents a series of four trips, based on a full retard mode as a home position. For each of trips 1, 2, 3 and 4, FIG. 6 illustrates a comparison between a crankshaft position and a cam adaptation and represents delta advance and failure thresholds (i.e., change thresholds) by the heavier dashed vertical lines either side of the lighter nominal value represented by a lighter dashed vertical line.

It can be seen for trips 1 and 2 that the normal judgment is positive, and the failure judgment is negative (i.e. no failure). In this case, the persistent memory (the EEPROM in this example) is updated so that the latest home position cam timing is held so that it can be used for the normal/failure judgment for the next trip. In the above described example, it is the trip adaptation value that is stored and is used as the reference adaptation value for the next trip.

FIG. 6 represents that between trips 2 and 3, maintenance is carried out, and for the basis of illustration, it is assumed that an error was made when reassembling the timing chain such that a cam timing misalignment results. In this case, as illustrated for trip 3, an advance of the cam timing has taken place so that the change in timing is outside the delta advance threshold (i.e., the permitted maximum change towards the advance timing with respect to the previous stored cam timing). For trip 3, therefore, the normal judgment is negative, and the failure judgment is a fail condition, in response to which the management information light is set on. Also, the reference cam timing is negative (i.e. no failure). In this case, the persistent memory (the EEPROM in this example) is not updated so that a previous home position cam timing (a previous reference adaptation value in the above example) is used for the normal/failure judgment for the next trip. One trip logic can be used to reduce the risk that the vehicle is returned to a customer.

Prior to trip 4, it is assumed that the engine is reworked. For the normal/failure judgment for trip 4, the home position cam timing (a previous reference adaptation value in the above example) from trip 2 is used as no such value was stored in respect of trip 3. Following reworking, it is assumed that the cam timing misalignment has been corrected. Accordingly, and as for trips 1 and 2, the normal judgment is positive, and the failure judgment is negative (i.e. no failure). In this case, the persistent memory (the EEPROM in this example) is updated so that the latest home position cam timing (the trip adaptation value in the above example) is held so that it can be used for the normal/failure judgment for the next trip.

Accordingly, there has been described an engine control system for an engine having a crankshaft and at least one camshaft with a variable cam timing device in a rotation transmitting train between the crankshaft and the camshaft. The engine control system includes means for detecting a deviation in a first value of a cam angle indicative of the home position at a first time and a second value of the cam angle indicative of the home position at a second time. The engine control system also includes means for storing an occurrence of the deviation. Where a deviation in the compared values is detected that does exceed a threshold value, a failure condition is detected and the MIL light is illuminated. In this case, the value stored for comparison is not updated.

Engine control can thus be provided for an engine having a crankshaft and at least one camshaft with variable cam timing in a rotation transmitting train between the crankshaft and the camshaft. A first value indicative of a cam angle at a home position at a first time can be compared to a second value indicative of a cam angle at the home position at a second, earlier, time. Where a deviation in the compared values is detected that does not exceed a threshold value, the first value can be stored for use in a subsequent comparison.

In a described example, on a first trip or first start, an adaptation value is determined and then stored in memory. On a subsequent start, the adaptation value determined again, and at a set point following the start, it is referenced to the previous trip and if the difference between the adaptation value for the current trip and the adaptation value at of the end the previous trip is greater than a given amount, for example one tooth of the cam sprocket cog in degrees, then a fault strategy is initiated whereby fault flags are set and the vehicle management information light (MIL) is set to indicate to the driver that there is a problem. Where this fault condition is detected, then the current adaptation value is not stored in the memory 28 as that adaptation value would be deemed to be out of range and unsuitable for memorization.

Accordingly, if the fault is then corrected on the engine and a next start is made, then a newly computed adaptation value will be compared to the previously stored adaptation value, rather than the faulty adaptation value, as the latter was not stored. Following a successful restart such that the difference between the adaptation value for the new start and the previously stored adaptation value is within the allowed tolerance, then the MIL is not set and normal EMS performance would be resumed.

As a result of storing the adaptation value in a persistent memory, the adaptation value can still be available after disconnecting and reconnecting the power supply to the memory, for example if a vehicle battery is disconnected during maintenance.

In the described example, the adaptation value is recalculated after each engine start (once per "trip"), the base cam timing being established at the engine start. In this example, when the engine starts, the engine management system forces the variable valve timing controller into the full retard position, the full retard position being the base position in the present example. At this time, there is variable valve controller provides zero timing advance. When that base position has been set for a period of time, for example 10 seconds, the timing is then measured to establish the base timing. It is this base timing that is used as the adaptation value.

The adaptation value is then used to calculate the cam position throughout the range of operation of the engine management system as the cam timing is calculated under normal conditions due to advancement. A pertinent time to calculate whether a shift in time has occurred is following an engine start.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. An engine control system for an engine having a crankshaft and at least one camshaft with variable valve timing in a rotation transmitting train between the crankshaft and the camshaft, the engine control system comprising:
   an adaptation controller operable to detect a deviation in a first value indicative of a cam angle at a home position at a first time and a second value indicative of a cam angle at the home position at a second time; and
   a storage operable to store the first value where the deviation does not exceed a threshold value;
   wherein the adaptation controller is operable to detect a deviation between the first value, being a value determined for a current trip, and the second value, being a value determined for a previous trip and held in the storage, the storage comprising a persistent memory device.

2. The engine control system of claim 1, wherein the storage comprises a memory device operable to store diagnostic information and to output information in response to an external request.

3. The engine control system of claim 1, wherein the storage comprises a persistent rewritable memory device.

4. The engine control system of claim 1, wherein the storage comprises an EEPROM memory device.

5. The engine control system of claim 1, comprising:
   a cam angle detector operable to detect an angle of rotation of the camshaft in a home position.

6. The engine control system of claim 5, wherein the cam angle detector comprises a crankshaft sensor for generating a signal indicative of a reference position of the crankshaft, a camshaft sensor for generating a signal indicative of a reference position of the camshaft, and a calculator for calculating the cam angle based on the signals from the crankshaft and camshaft sensors.

7. The engine control system of claim 5, wherein the home position is where the variable cam timing device is in a maximum retard position.

8. The engine control system of claim 5, wherein the home position is where the variable cam timing is in a maximum advance position.

9. The engine control system of claim 5, wherein the home position is where the variable cam timing in a locked position.

10. The engine control system of claim 1, further comprising a variable valve timing controller operable to control the variable cam timing into a target position.

11. The engine control system of claim 1, wherein the adaptation controller is operable:
    where the deviation does not exceed a threshold value, to cause the first value to be stored in the storage; and
    where the deviation does exceed a threshold value to prohibit the storage of the first value in the storage and to flag a fault condition.

12. The engine control system of claim 11, wherein the adaptation controller is operable to illuminating a fault light on flagging a fault condition.

13. The engine control system of claim 11, further comprising a failsafe controller operable to controlling the variable cam timing in a fail safe manner where the adaptation controller determines that the deviation exceeds the threshold value.

14. The engine control system of claim 1, wherein the threshold value corresponds to a one-tooth shift of the rotation transmitting train.

15. The engine control system of claim 1, wherein the first value and the second value are cam angle adaptation values.

16. An internal combustion engine system comprising an internal combustion engine and an engine control system according to claim 1.

17. The engine control system of claim 1, wherein the first value and the second value are detected at actual measuring times.

18. An engine control system for an engine having a crankshaft and at least one camshaft with a variable valve timing device in a rotation transmitting train between the crankshaft and the camshaft, the engine control system comprising:
    a cam angle detector for detecting a cam angle indicative of an angle of rotation of the camshaft;
    a home position determining device which detects whether the variable cam timing device is in a home position;

a controller for controlling the variable cam timing device into a target position based on signals from the cam angle detector and the home position determining device;

a skip detector for detecting a skip between a first value of the cam angle indicative of the home position and a second value of the cam angle indicative of the home position detected later; and a storage memory for storing an occurrence of the skip between the first and second values when the skip does not exceed a threshold value.

19. The engine control system of claim 18, wherein the first value and the second value are detected at actual measuring times.

* * * * *